(12) United States Patent
Lepoint

(10) Patent No.: US 11,321,476 B2
(45) Date of Patent: May 3, 2022

(54) SELECTIVELY SHARING DATA IN UNSTRUCTURED DATA CONTAINERS USING ATTRIBUTE BASED ENCRYPTION

(71) Applicant: SRI International, Menlo Park, CA (US)

(72) Inventor: Tancrede Lepoint, Jersey City, NJ (US)

(73) Assignee: SRI International, Menlo Park, CA (US)

( * ) Notice: Subject to any disclaimer, the term of this patent is extended or adjusted under 35 U.S.C. 154(b) by 290 days.

(21) Appl. No.: 16/428,415

(22) Filed: May 31, 2019

(65) Prior Publication Data

US 2019/0394020 A1 Dec. 26, 2019

Related U.S. Application Data

(60) Provisional application No. 62/854,977, filed on May 31, 2019, provisional application No. 62/690,297, filed on Jun. 26, 2018.

(51) Int. Cl.
*G06F 21/62* (2013.01)
*H04L 9/06* (2006.01)
*H04L 9/08* (2006.01)
*H04L 9/30* (2006.01)

(52) U.S. Cl.
CPC ............ *G06F 21/62* (2013.01); *H04L 9/0618* (2013.01); *H04L 9/0861* (2013.01); *H04L 9/30* (2013.01)

(58) Field of Classification Search
CPC ...................................................... G06F 21/62
See application file for complete search history.

(56) References Cited

U.S. PATENT DOCUMENTS

| 8,559,631 | B1 * | 10/2013 | Waters | H04L 9/3073 380/28 |
| 8,683,602 | B2 * | 3/2014 | Waller | G06F 21/10 726/26 |
| 2019/0258813 | A1 * | 8/2019 | Lewis | G06F 21/6209 |
| 2019/0260753 | A1 * | 8/2019 | Lewis | G06F 21/6218 |

* cited by examiner

*Primary Examiner* — Bradley W Holder
(74) *Attorney, Agent, or Firm* — Moser Taboada

(57) ABSTRACT

Systems and methods for selectively sharing of portion of unstructured data containers/documents based on security attributes or policies used to encrypt/decrypt data within the unstructured data containers using attribute-based encryption (ABE) are provided herein. In some embodiments, a system includes a key generation authority to generate encryption keys based on a selected cryptographic security scheme and one or more security attributes or security policies; an encryption service to selectively encrypt one or more data subgroups using the one or more public keys and based on one or more security attributes or security policies assigned to the one or more data subgroups with the unstructured data containers; and a decryption service to decrypt the one or more data subgroups within unstructured data containers using the one or more secret keys and the one or more public keys.

8 Claims, 5 Drawing Sheets

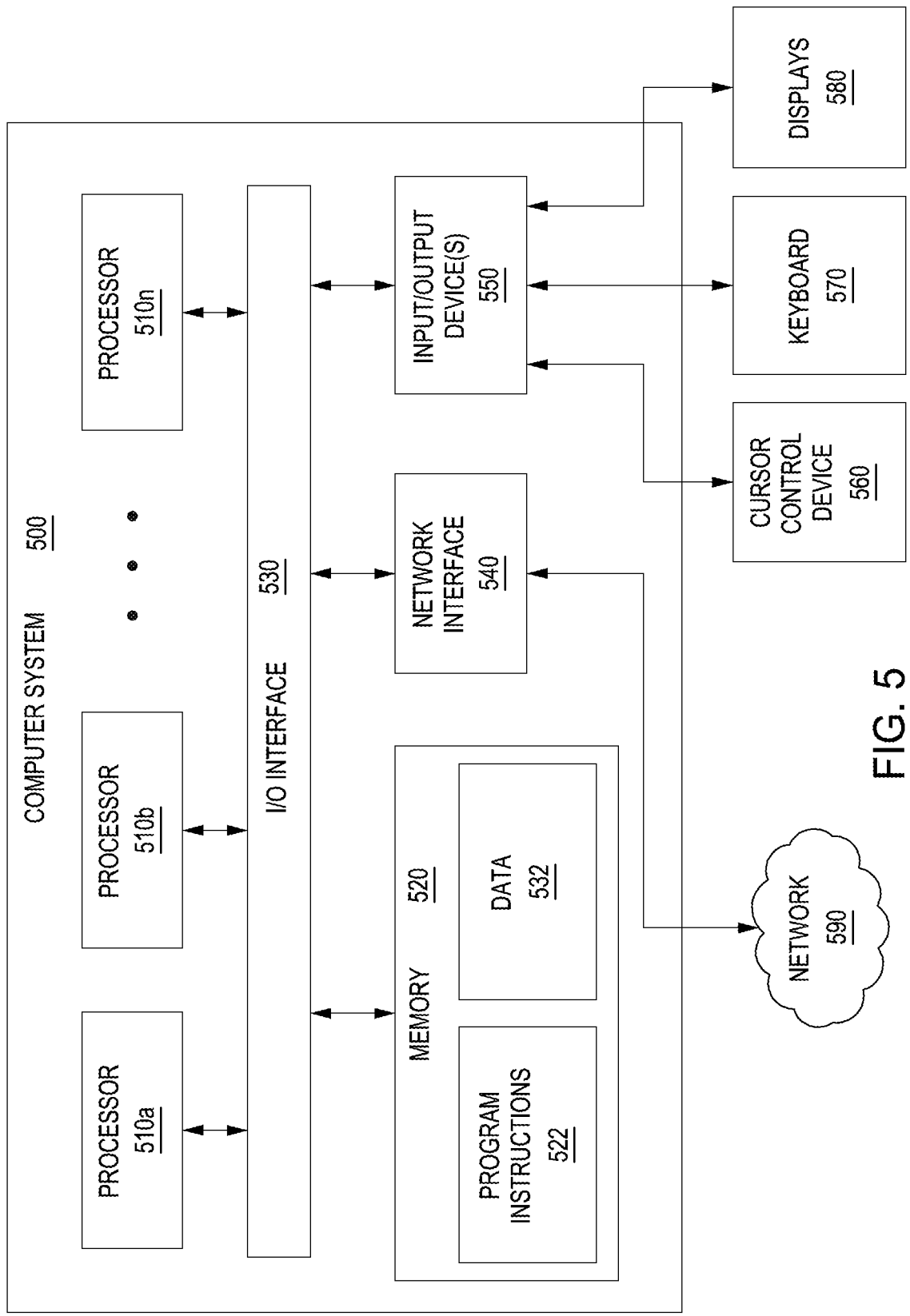

SELECTIVELY SHARING DATA IN UNSTRUCTURED DATA CONTAINERS USING ATTRIBUTE BASED ENCRYPTION

CROSS-REFERENCE

This application claims priority to and the benefit of U.S. Provisional Patent Application Ser. No. 62/690,297, filed Jun. 26, 2018 and U.S. Provisional Patent Application Ser. No. 62/854,977, filed May 31, 2019, both of which are incorporated herein by reference in their entireties.

GOVERNMENT RIGHTS

Embodiments of the present invention were made with Government support under contract no. N66001-15-C-4071 awarded by the Space and Naval Warfare Systems Command Systems Center Pacific. The Government has certain rights in the embodiments described herein.

FIELD

Embodiments of the present disclosure generally relate to selective encryption and decryption of unstructured data containers/documents. More particularly, embodiments of the present disclosure relate to systems and methods configured to selectively sharing portions of unstructured data containers/documents based on security attributes or policies used to encrypt/decrypt data within the unstructured data containers using attribute-based encryption (ABE).

BACKGROUND

Private data sharing remains a critical challenge for individuals, enterprises, and national/international organizations. While sharing data is essential, sharing sensitive data with the wrong partner can have devastating consequences or even be prohibited by law.

Fine-grained access control today is not achieved only by cryptographic means. Current selective access control relies on a (replicated) trusted centralized system that shares with a recipient only the data they are authorized to see (i.e., the unauthorized data, whether encrypted or not, is typically not sent to the recipient along with the data they are authorized to see). To selectively share information that is contained in commonly used document formats without a centralized system (e.g., docx for text, jpeg for images, xls* for spreadsheets, pptx for presentations, and the like), the commonly used process is to manually remove sensitive information over multiple versions of the same file according to the recipient. Sharing and maintaining multiple versions of the same document is difficult and undesirable. Furthermore, this lack of control results in people, businesses, organizations, and governments simply not sharing.

Therefore, a need exists in the art for improved methods and systems for fine-grained access control to selectively share sensitive data in a single version of an unstructured document to multiple parties using attribute based or hybrid-based encryption/decryption.

SUMMARY

Systems and methods for selectively sharing of portion of unstructured data containers/documents based on security attributes or policies used to encrypt/decrypt data within the unstructured data containers using attribute-based encryption (ABE) are provided herein.

In some embodiments, a method for generating encryption and decryption keys to selectively encrypt and decrypt portions of a collection of data in an unstructured data container based on one or more security attributes or security policies includes: generating a master security key and at least one public key based on a selected cryptographic security scheme, generating one or more secret keys using the master security key and one or more security attributes or security policies to be applied to one or more data subgroups within the collection of data in the unstructured data container; distributing the at least one public key for use by at least one of another device, an encryption service, or a decryption service to selectively encrypt and/or decrypt one or more data subgroups within the collection of data using the one or more public keys and based on one or more security attributes or security policies, assigned to the one or more data subgroups to generate a ciphertext of the collection of data; and distributing to one or more parties the one or more secret keys that will be used to decrypt the one or more data subgroups within the collection of data.

In some embodiments, a method for selectively encrypting portions of data based on one or more security attributes or security policies includes accessing a collection of data in an unstructured data container having one or more data subgroups; assigning one or more security attributes or security policies to one or more data subgroups within the collection of data in the unstructured data container to create a security access structure control based on those attributes or policies for access to the collection of data in unstructured data container; and sending a call to an encryption service, wherein the call includes the collection of data unstructured data container and the security access structure control to selectively encrypt the one or more data subgroups within the unstructured data container collection of data based on the one or more security attributes or security policies assigned to each of the one or more data subgroups within the unstructured data container collection of data to obtain an encrypted ciphertext of the collection of data subgroups in the unstructured data container.

In some embodiments, a method for selectively decrypting portions of data based on one or more security attributes or security policies includes: access a collection of data in an unstructured data container a collection of data having selectively encrypted one or more data subgroups within the collection of data; and responsive to a request by a first user, sending a call to a decryption service to selectively decrypt the one or more data subgroups within the unstructured data container collection of data using a secret key associated with the first user and based on the one or more security attributes or security policies assigned each of the one or more data subgroups within the collection of data, wherein the call includes the collection of data and the one or more security attributes or security policies.

In some embodiments, A system for selectively encrypting and decrypting portions of a collection of data in an unstructured data container based on one or more security attributes or security policies includes: a key generation authority configured to generate a master security key and at least one public key based on a selected cryptographic security scheme, and generate one or more secret keys using the master security and one or more security attributes or security policies; an encryption service configured to selectively encrypt one or more data subgroups within the collection of data using the one or more public keys and based on one or more security attributes or security policies assigned to the one or more data subgroups to generate a ciphertext of the collection of data subgroups in the unstructured data container; and a decryption service configured to decrypt the ciphertext of the one or more data subgroups within in the unstructured data container collection of data of the ciphertext using the one or more secret keys and the one or more public keys.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 5 is a depiction of a computer system that can be utilized in various embodiments of the present principles.

Figure 1:
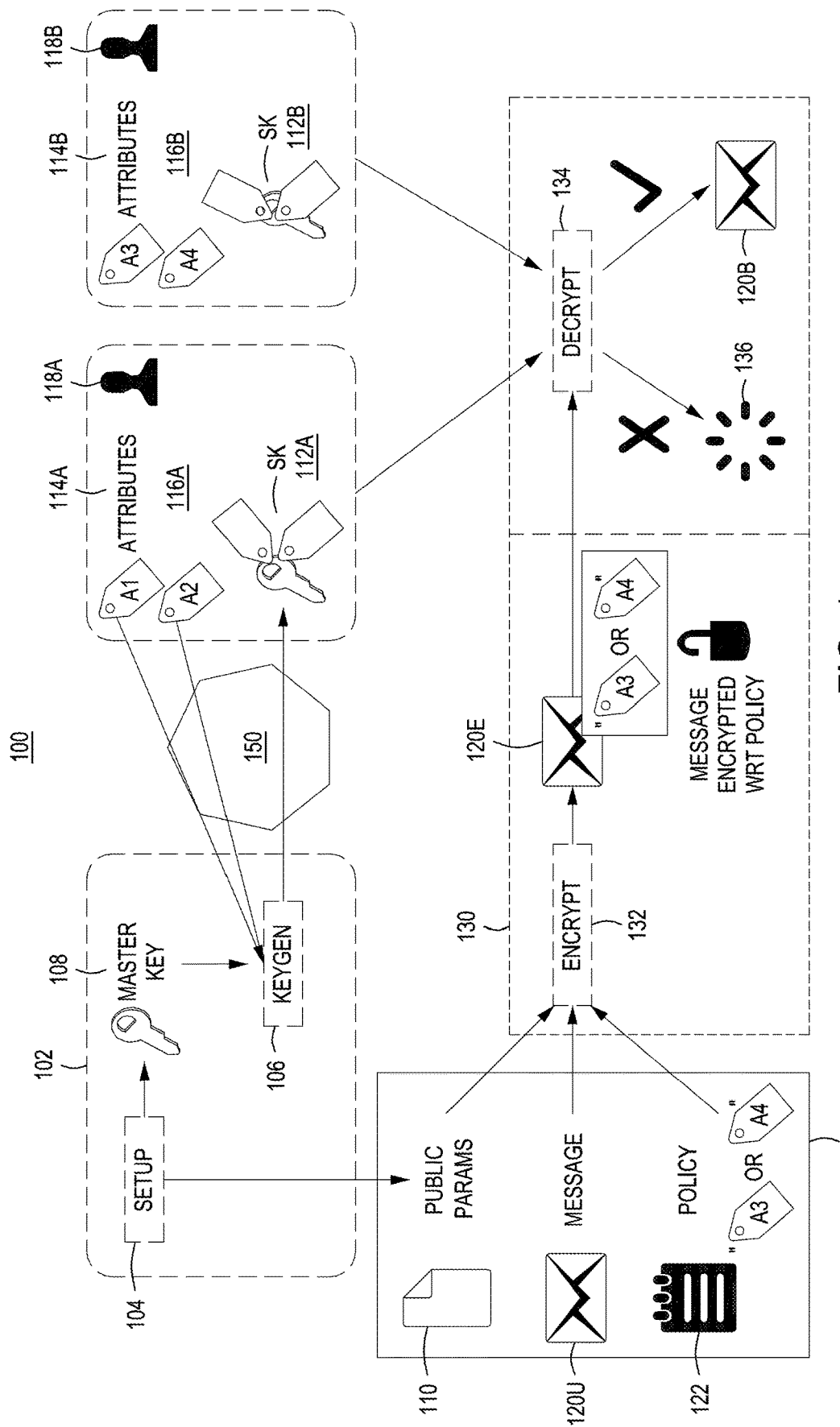
FIG. 1 illustrates an exemplary embodiment of the selective access control system in accordance with embodiments of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present disclosure generally relate to selective encryption and decryption of documents. More particularly, embodiments of the present disclosure describe systems and methods configured to selectively encrypt and decrypt portions of data either based on one or more attributes, or combinations of attributes, applied to various subsections of the documents or a given set of policies (also referred to as a security access structure) applied to various subsections of the documents. The system receives a collection of data in unstructured data containers containing one or more data subgroups that have one or more security level attributes assigned to the one or more data subgroups, or a given security policy. The proposed methods and systems to modify a document so as to selectively share subsets of the data it contains with target users according to access policies or according security attributes in such a way that if one is not the intended recipient, the corresponding portion of the document is unintelligibly encrypted. The advantage of these inventive methods and systems is that the same document can be shared with all parties, and parties can only see the subsets of data they are intended to see (i.e., selectively share sensitive data in a single version of an unstructured document).

The system encrypts the data subgroups using either an attribute-based encryption (ABE) or hybrid-based encryption method and generates an encrypted ciphertext. In ABE, ciphertexts and/or keys are associated with attributes which determine when decryption is possible. In some embodiments, the decryption keys embed attributes and the data is associated to policies. This is called ciphertext-policy attribute-based encryption (CPABE). For example, in a CPABE scheme, keys are associated with security attributes like '(continent=Europe), (trust=2), (org=NATO)', while ciphertexts (i.e., the encrypted data) are associated with security access policies like '((continent==Europe) AND (org==NATO)) OR (trust>3)'. In other embodiments, ABE is used where the data has one or more security attributes and the decryption keys are associated to policies. This type of encryption scheme is called key policy attribute-based encryption (KPABE).

As described above, security policies are a combination of security attributes combined in a logical relation that can either be associated with data in an unstructured data container (in a CPABE scheme), or used to generate encryption/decryption keys (in a KPABE scheme). Decryption is possible only when the key attributes satisfy the security policy. For instance, in the above example, secret keys having both security attributes '(continent=Europe); (org=NATO)' would be able to decrypt data encrypted using a security access policies like '((continent==Europe) AND (org==NATO)) OR (trust>3)'. Similarly, secret keys having both security attributes '(continent=Europe); (trust>3)' would be able to decrypt data encrypted using the same security access policy. Using the ABE schemes described above, the encryption/decryption services do not need to know the exact identities of all other entities who should be able to access the data, but rather describes the entities allowed to access portion of the data in terms of descriptive attributes applied.

Unstructured data containers are characterized as unstructured documents, files, collections of data, etc. not stored in a relational database are a usual vector in information sharing, both in civilian and in military contexts. Examples of unstructured data containers include, for example, MICROSOFT EXCEL files, MICROSOFT WORD files, GOOGLE documents (text, spreadsheets, emails), HTML pages PDF files, image files, and the like. Unstructured documents and data has become a de-factor standard to exchange information. For example, in military contexts where data is shared across countries or DoD departments, the data is stored in documents and documents are sent (in a protected way, possibly on a shared network) to the intended recipients. When the recipient should not only see portion of the data, the document is either shared with tight time constraints (i.e., at the last minute to avoid leakage of information) or is manually duplicated and appropriately redacted for each intended party. Another example is that of a company where administrative personnel or Human resources should have access to more fine-grained information that the rest of the employees (for example, the G&A costs, the fees, while the employees only need to access the fully burden labor costs). Another example is that of a document that should be redacted according to some predefined levels, such as clearance levels (TOP SECRET, SECRET, CONFIDENTIAL).

For example, the Rim of the Pacific Exercise (RIMPAC) is the world's largest international maritime exercise taking place in the Pacific every two years. It involves 27 nations, 45 ships, five submarines and more than 200 aircrafts. Information sharing is one of the biggest challenge they meet. The inventive systems and methods described here could allow PACOM (the US Pacific Command) to issues decryption keys to each of the involved countries with attributes of the form 'asia', 'europe', 'exercise1', 'exercise2', 'trust_level=3', 'trust_level=2', 'trust_level=1', and send to all participants the same MS EXCEL spreadsheet where some information (e.g., column A) is only shared if the country's secret key verifies the policy '(asia AND trust_level==3) OR (Europe AND trust_level>=2)', some other information (e.g., cells in the range A15:B30) is only shared according to the policy 'exercise1', some other information (e.g., spreadsheet named "July 2018") is only shared according to the policy "trust_level==3 OR exercise2', and all the rest of the data is available for everyone to see.

Various embodiments for selectively encrypting and decrypting portions of data within unstructured data containers (e.g., unstructured documents and files) based on a given attribute or security policy, and sharing data in those unstructured documents using attribute-based encryption are now described in detail with respect to FIGS. 1-5.

FIG. 1 depicts a high-level block diagram of embodiments of a selective access control (SAC) system 100 that is configured to selectively encrypting and decrypting portions of data within unstructured data containers based on a given attribute, and sharing data in those unstructured data containers. The SAC system 100 include a key generation authority system 102, a central party system 103, encryption/decryption services 130, and one or more user devices $116_x$ associated with one or more users $118_x$. The encryption/decryption services 130 includes both encryption service 132 and decryption service 134. In some embodiments, the encryption service 132 and decryption service 134 are part of the same service and/or on the same server computer system. In other embodiments, the encryption service 132 and decryption service 134 are provided by different services and/or are not on the same server. In some embodiments, encryption/decryption services 130 may be part of the key generation authority system 102 or user devices $116_x$.

Each systems, services and devices 102, 103, 130, $116_x$ included in the SAC system 100 may by embodied by computer system 500 illustrated by FIG. 5 and described below in further detail. Furthermore, each systems, services and devices 102, 103, 130, $116_x$ included in the SAC system 100 may communicate with each other directly or over a networks 150. In some embodiments, the networks 150 comprise one or more communication systems that connect computers by wire, cable, fiber optic and/or wireless link facilitated by various types of well-known network elements, such as hubs, switches, routers, and the like. The networks 150 may include an Internet Protocol (IP) network or other packet-based communication networks, and may employ various well-known protocols to communicate information amongst the network resources.

The key generation authority system 102 includes a setup module 104 and a key generation module 106. The setup module 104 includes a setup algorithm that uses a cryptographic security scheme to generate one or more public keys 110 (pubparams) and a master secret key 108 (msk). The msk 108 is used along with a set of security attributes 114 (S) as input to the key generation module 106 to generate a secret key 112 (sk) for each user $118_x$ that is given some sort of access to the document/message 120. One or more security attributes 114 S or security polic(ies) 122 will be applied to the document/message 120 to be protected, and used in the generation of secret keys 112 (sk) depending on the cryptographic security scheme used. The cryptographic security scheme selected to generate one or more public keys 110 (pubparams), secret keys 112 (sk), and a master secret key 108 (msk) may include a Ciphertext-policy Attribute Based Encryption (CPABE) scheme, a key-policy ABE scheme (KPABE), or a hybrid encryption scheme.

CPABE and KPABE schemes used in some embodiments described herein consist of the following processes: (1) setup and key generation process (described in method 200), (2) an encryption process (described in method 300), and (4) a decryption process (described in method 400).

For CPABE schemes, the following methods are performed:

Setup: given a security parameter S 114, the setup algorithm of setup module 104 outputs pubparams 110 (i.e., public keys) and a master secret key msk 108.

KeyGen: Given msk 108 and a set of attributes S 114, the KeyGen module 106 outputs a secret key sk 112.

Encrypt: Given pubparams 110, an access structure/security policy A 122, and a message $120_U$ (i.e., unencrypted document $120_U$), the encryption service/module 132 outputs an encrypted ciphertext ct $120_E$ (i.e., encrypted document $120_E$).

Decrypt: Given pubparams 110, a ciphertext ct $120_E$, and a secret key sk 112, decryption service/module 134 outputs either a message msg* $120_B$ (e.g., document $120_B$ having at least some portions of it decrypted that only user B $118_B$ can see) or an error 136.

A CPABE scheme is used when, for all messages msg 120, access structure A 122, and set of attributes S 114 in A, then the decryption service 134 outputs msg with high probability.

For KPABE schemes, the following methods are performed:

Setup: given a security parameter 114, setup module 104 outputs public parameters pubparams 110 and a master secret key msk 108.

KeyGen: Given msk 108 and an access structure A 122, KeyGen module 106 outputs a secret key sk 112.

Encrypt: Given pubparams 110, a set of attributes S 114, and a message msg $120_U$, the encryption service/module 132 outputs a ciphertext ct $120_E$.

Decrypt: Given pubparams 110, a ciphertext ct $120_E$, and a secret key sk 112, decryption service/module 134 outputs either a message msg* (e.g., document $120_B$ having at least some portions of it decrypted that only user B $118_B$ can see) or an error 136.

A KPABE scheme is used when, for all messages msg 120, access structure A 122, and set of attributes S 114 in A, then the decryption service 134 outputs msg with high probability.

The following processes: (1) setup and key generation process (described in method 200), (2) an encryption process (described in method 300), and (3) a decryption process (described in method 400) are now described in further detail with respect to FIG. 1.

Figure 2:
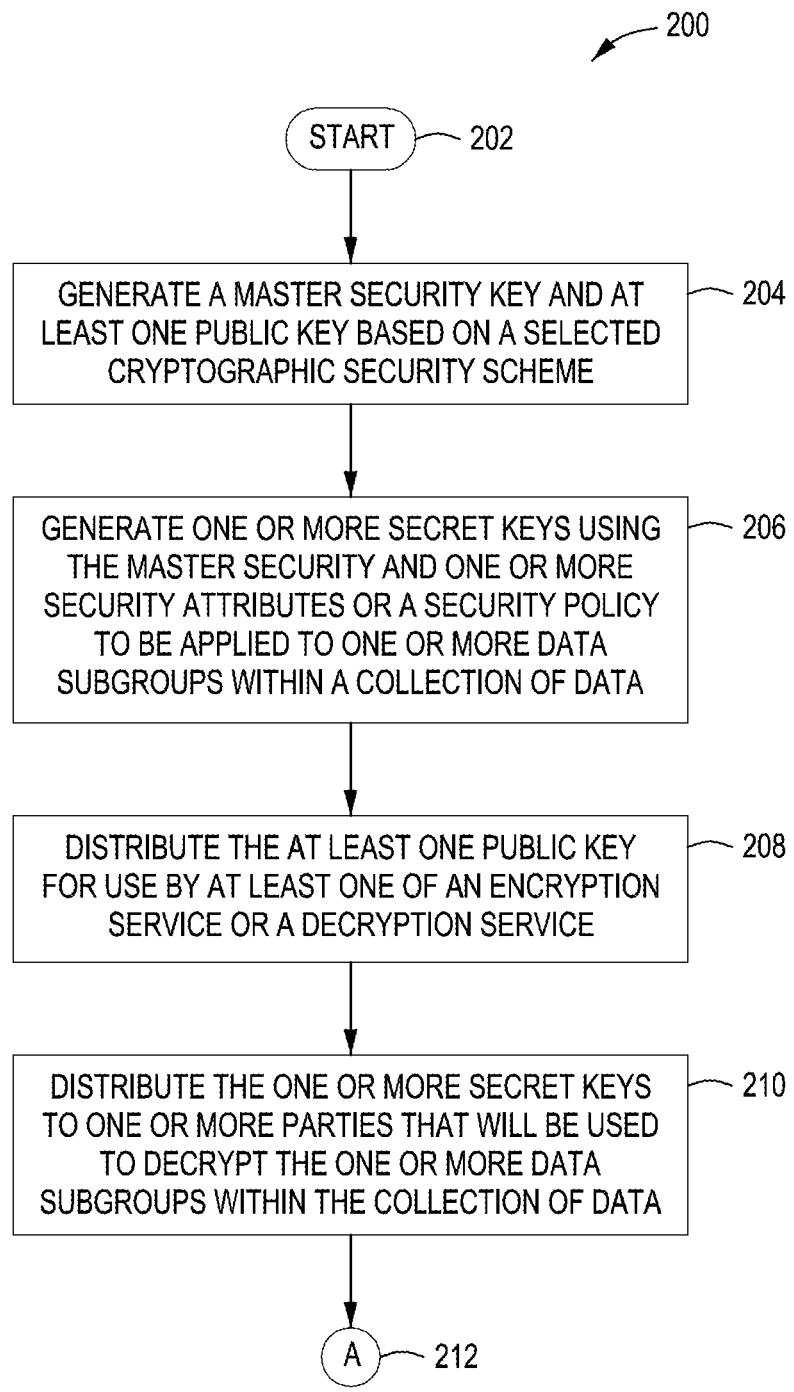
FIG. 2 illustrates a flow chart of a method for generating encryption and decryption keys to selectively encrypt and decrypt portions of a collection of data based on one or more security attributes in accordance with embodiments of the present principles.

FIG. 2 illustrates a flow chart of at least one method 200 for generating encryption and decryption keys and parameters to selectively encrypt and decrypt portions of a collection of data (i.e., message/document 120) based on one or more security attributes 114 that may be performed by the key generation authority system 102 in accordance with embodiments of the present disclosure. The method 200 starts at 202 and proceeds to 204 where the offline setup and key generation process begins.

At 204, a master security key 108 and at least one public key 110 (pubparams) based on a selected cryptographic security scheme is generated. The only devices/entities that can issue decryption keys are those in possession of master security key msk 108. In some embodiments, the selected cryptographic security scheme may include a CPABE scheme, a key-policy ABE scheme (KPABE), or a hybrid encryption scheme. In other embodiments, other attribute-based encryption schemes may be use.

At 206, one or more secret keys 112 using the master security and one or more security attributes or a security policy to be applied to one or more data subgroups within a collection of data is generated. For example, in the RIMPAC use case using a CPABE scheme, the set of all security attributes includes: 'asia', 'europe', 'exercise1', 'exercise2', 'trust_level=3', 'trust_level=2', and 'trust_level=1'. If user B $118_B$ on device $116_B$ has been given clearance for security attributes $114_B$ "ASIA" and "trust_level==3", secret key sk $112_B$ would be generated by key generation module 106 using security attributes $114_B$ "ASIA" and "trust_level==3" and msk 108 an inputs. In a document having data associated with a security policy, user B would only be able to decrypt portions of the document using secret key sk $112_B$. In a KPABE scheme, secret key sk $112_B$ would be generated by key generation module 106 using a security policy 122. Under the KPABE scheme, in a document having data associated with security attributes $114_B$ "ASIA" and "trust_level==3", user B would only be able to decrypt portions of the document using secret key sk $112_B$.

At 208, the at least one public key for use by at least one of an encryption service 132 or a decryption service 134 is distributed to the encryption service 132 and/or a decryption service 134. At 210, the one or more secret keys are distributed to one or more parties that will be used to decrypt the one or more data subgroups within the collection of data. For example, in the RIMPAC use case, secret key sk $112_B$ would be transmitted to user B $118_B$ on device $116_B$. In some embodiments, the transmission of keys is done using secure communication protocols. The setup and key generation process 200 ends at 212. However, after the setup and key generation process 200 is completed, the method continues to the encryption process described in method 300.

Figure 3:
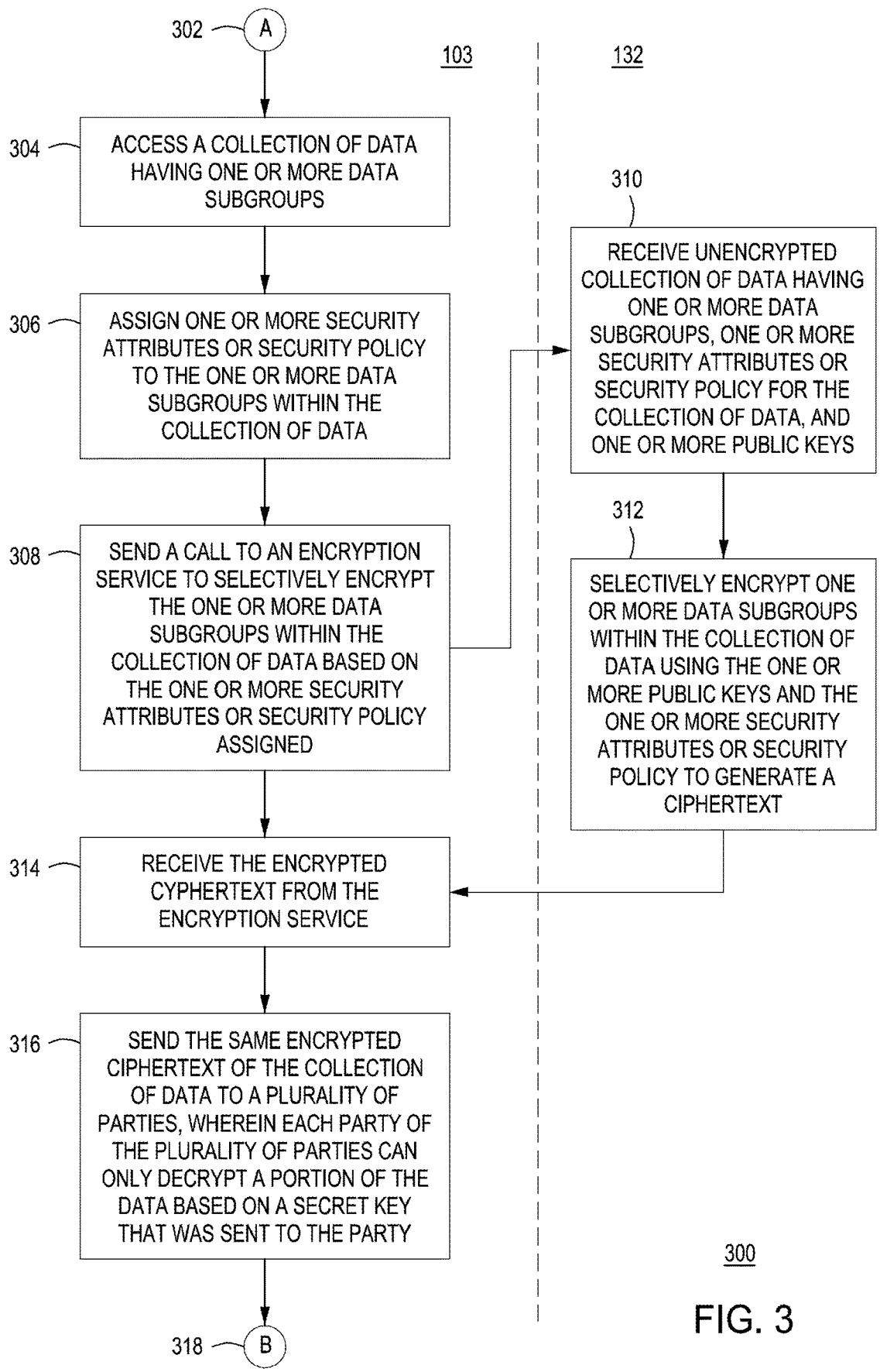
FIG. 3 illustrates a flow chart of a method for selectively encrypting portions of data based on one or more security attributes in accordance with embodiments of the present principles.

FIG. 3 illustrates a flow chart of at least one method 300 for selectively encrypting portions of data based on one or more security attributes in accordance with embodiments of the present disclosure. The method 300 begins at 302 and proceeds to 304 where a collection of data in an unstructured data containers (i.e., an unstructured data container/document $120_U$) having one or more data subgroups is accessed by a central party 103. In some embodiments, the central party 103 can be any managing organization that can assign security attributes 114 as part of a security policy 122 to at least some portions of a message or unstructured data container. In some embodiments, anyone with access to the public keys/pubparams 110 can create or access an unstructured data container $120_U$ to selectively share subset of its data according to the security attributes or security policies applied to the document. In some embodiments, anyone having access to the encryption service 132 who wants to protect (parts of) a document $120_U$ can do so.

At 306, one or more security attributes 114 (under the KPABE scheme) or a security policy 122 (under the CPABE scheme) are assigned to the one or more data subgroups within the collection of data in unstructured data container $120_U$. In some embodiments, the central party 103 creates the security attributes 114 or security policy 122. In other embodiments, the central party 103 receives the set of security attributes 114 or security policy 122 that can be applied to the unstructured documents $120_U$. In some embodiments, the security attributes 114 or security policy 122 are applied as tags (e.g., XML tags, meta data, and the like) to the one or more data subgroups within the collection of data $120_U$.

At 308, a call to an encryption service 134 is sent to selectively encrypt the one or more data subgroups within the collection of data $120_U$ based on the one or more security attributes 114 or security policy 122 assigned to the one or more data subgroups. In some embodiments, the call is sent by the user device 116 responsive to a request imitated by a 118 on the user device 116. In some embodiments, a Selective Access Control Add-in or plug-in can be loaded in an application that provides a selectable object, that when selected, initiates the call to the encryption service 132 with the proper input parameters.

The method 300 proceeds to 310 where the encryption service 132 receives the call from the central party 103 including the unencrypted collection of data $120_U$ having one or more data subgroups and either the one or more security attributes 114 (under the KPABE scheme) or security policy 122 (under the CPABE scheme) for the collection of data. In some embodiments, the one or more public keys/pubparams 110 are also received via the call from the central party 103. In some embodiments, the encryption service 132 may already have the one or more public keys 110 needed to encrypt the document and does not need to be provided the public keys 110 from the central party 103.

At 312, the encryption service 132 selectively encrypts one or more data subgroups within the collection of data $120_u$ using the one or more public keys 110 and either the one or more security attributes 114 (under the KPABE scheme) or security policy 122 (under the CPABE scheme) to generate an encrypted document/ciphertext $120_E$. As described above, the encryption schemes used may include a CPABE scheme, KPABE scheme, a hybrid encryption scheme, or other ABE schemes. The encryption service 132 then provides the encrypted document/ciphertext $120_E$ to the requesting party (e.g., the central party 103) to be sent to the desired parties. In some embodiments, the unencrypted document $120_u$ is replaced by encrypted ciphertext document $120_E$ and elements within the document are tagged as a protected element with specific security attributes 114 or security policy 122.

The method proceeds to 314 where the central party 103 (i.e., the requesting party in this case), receives the encrypted ciphertext $120_E$ from the encryption service 132. At 316, the same encrypted ciphertext $120_E$ is sent to a plurality of parties (e.g., users A and B on devices $116_A$ and $116_B$), wherein each party of the plurality of parties can only decrypt a portion of the data based on a secret key 112 that was sent to the party. The encryption process 300 ends at 318.

After the encryption process 300 is completed, the method continues to the decryption process described in method 400.

Figure 4:
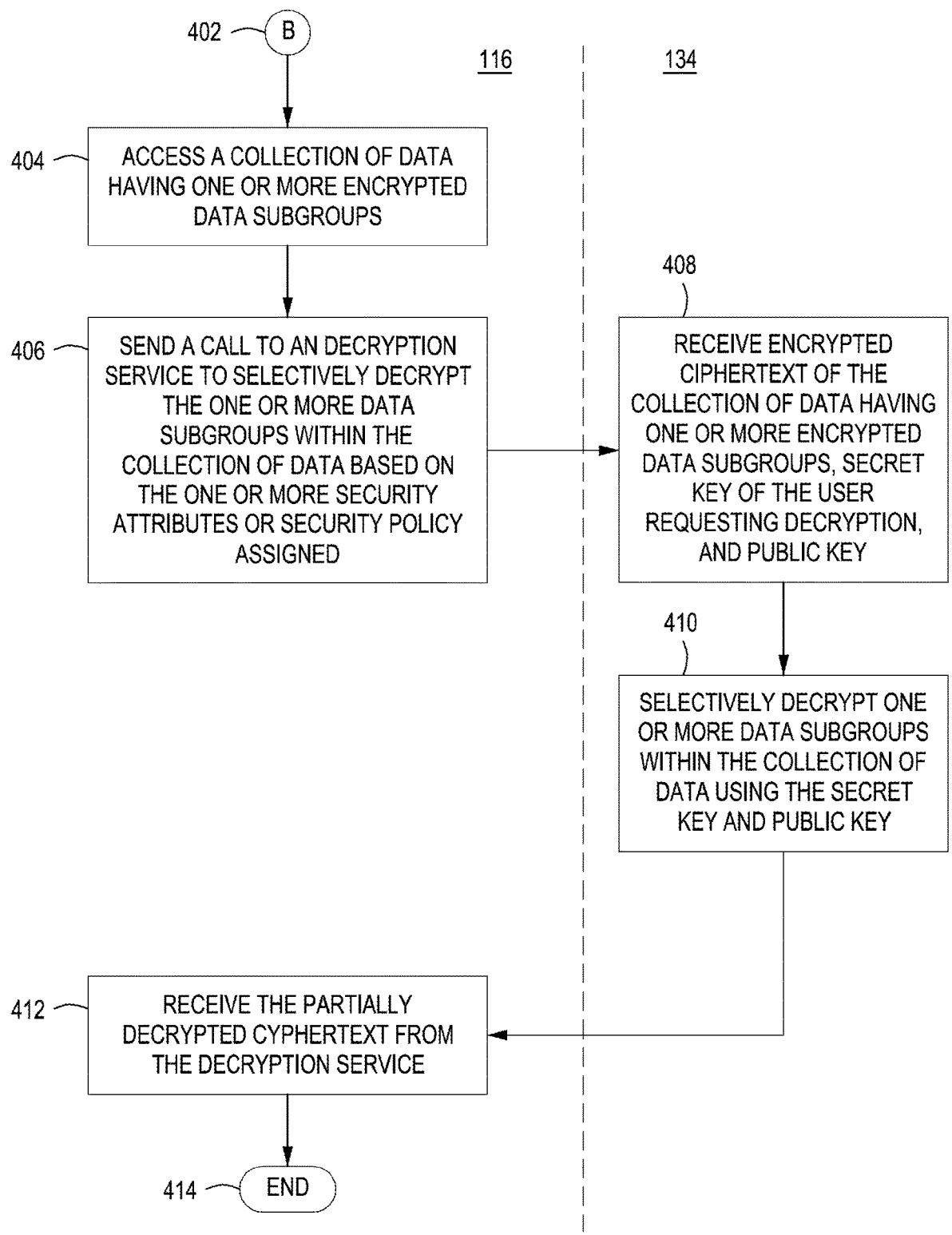
FIG. 4 illustrates a flow chart of a method for selectively decrypting portions of data based on one or more security attributes in accordance with embodiments of the present principles.

FIG. 4 illustrates a flow chart of at least one method 400 for selectively decrypting portions of data based on one or more security attributes or security policy in accordance with embodiments of the present principles. The method 400 begins at 402 and proceeds to 404 where a collection of data having one or more encrypted data subgroups (i.e., an encrypted ciphertext document $120_E$) is accessed by a user 118 on a user device 116 (for example, user B 118$_B$ on user device 116$_B$). In some embodiments, anyone with access to a decryption key and a document with protected subsets of data can access all data where the attributes makes the policies evaluate to TRUE. In some embodiments, anyone having access to the decryption service 134, a secret key sk 112 issued by 102, and a document 120$_E$, who wants to access all the content of 120$_E$ it is allowed to see using their secret key, may do so.

At 406, a call is sent from a user device 116 to a decryption service 134 to selectively decrypt the one or more data subgroups within the encrypted ciphertext document 120$_E$ based on the one or more security attributes 114 or security policy 122 assigned to the subgroups of data within the encrypted ciphertext document 120$_E$. In some embodiments, the call is sent by the user device 116 responsive to a request imitated by a 118 on the user device 116. In some embodiments, a Selective Access Control Add-in or plug-in can be loaded in an application that provides a selectable object, that when selected, inmates the call to the decryption service 134 with the proper input parameters.

The method 400 proceeds to 408 where the decryption service 134 receives the call from the user device 116 including the encrypted ciphertext 120$_E$ and the secret key associated with the requesting user 118. In some embodiments, the one or more public keys/pubparams 110 are also received via the call. In some embodiments, the decryption service 134 may already have the one or more public keys 110 needed to decrypt the document and does not need to be provided the public keys 110 from the user device 116.

At 410, the decryption service 134 selectively decrypts one or more data subgroups within the encrypted ciphertext document 120$_E$ using the one or more public keys 110 and the secret key associated with the requesting user 118 to generate a selectively decrypted document/ciphertext (e.g., document 120$_B$). In some embodiments, the encrypted ciphertext document 120$_E$ is replaced by a selectively decrypted document (e.g., document 120$_B$). The decryption service 134 then provides the a selectively decrypted document/ciphertext (e.g., document 120$_B$) to the requesting device (e.g., the user B 118B on device 116B) to be viewed or edited by the requesting party.

The method proceeds to 412 where the user device 116 (e.g., the requesting device 116$_B$), receives the selectively decrypted document 120$_B$ from the decryption service 134. The decryption process 400 ends at 414.

In some embodiments, hybrid encryption may be used for optimization. Specifically, as current ABE technologies have large ciphertext expansion (i.e., the output of the encrypt algorithm is significantly larger than the input msg), some embodiments may use a hybrid encryption scheme. Hybrid encryption is a mode of encryption that merges two or more encryption systems. It incorporates a combination of asymmetric and symmetric encryption to benefit from the strengths of each form of encryption. These strengths are respectively defined as speed and security.

An exemplary form of hybrid encryption that may be used in embodiments consistent with the present invention is described below.

Hybrid encryption: Let $E_{pk}$=(KeyGen$_{pk}$, Encrypt$_{pk}$, Decrypt$_{pk}$) be a public key encryption scheme and $E_{sk}$=(KeyGen$_{sk}$, Encrypt$_{sk}$, Decrypt$_{sk}$) be a symmetric key encryption scheme.

If (pk, sk) are the public and secret keys outputted by KeyGen$_{pk}$, the hybrid encryption of a message msg under pk using $E_{sk}$ is constructed as follows:
Generate a symmetric key k using KeyGen$_{pk}$;
Encrypt msg using Encrypt$_{sk}$ and sk to obtain ct$_{sk}$;
Encrypt k using Encrypt$_{pk}$ and pk to obtain ct$_{pk}$;
Output the hybrid ciphertext ct=(ct$_{pk}$, ct$_{sk}$).

To decrypt such a hybrid ciphertext, proceed as follows:
Decrypt ct$_{pk}$ using Decrypt$_{pk}$ and sk to recover k*;
Decrypt ct$_{sk}$ using Decrypt$_{sk}$ and k* to recover msg*.

In some embodiments, a similar system as described above could be set up in order to protect parts of a voice communication. During a voice conservation, the selective access control (SAC) system 100 could be activated according to a security policy P and the voice communication would be encrypted so that only users that have been issued keys with attributes making the policy P evaluate to TRUE could decrypt the communication and listen to the protected content. The other users would only receive encrypted data which would not reveal the content of the discussion.

Other applications of the selective access control (SAC) system 100 could include selective protection of parts of an email, selective protections of parts of a repository, selective protections of parts of an image, and selective protections of parts of a video and/or audio stream.

In some embodiments, the add-ins, plug-ins, etc. used for various document software applications (e.g., MS OFFICE, GOOGLE DOCS, etc.) may be created using a JavaScript API for MS OFFICE, for example. These add-ins, plug-ins may use minimal backend services (accessible through a REST API) to encrypt and decrypt data within the documents using a CPABE/KPABE/Hybrid schemes. After encryption, the document remains a valid MS OFFICE document, for example, and can be opened and read without the encrypted cells as any other MS OFFICE document by any software. In some embodiments, the encrypted cells are stored in an XML custom part of the MS OFFICE document through the JavaScript API. When the add-in is loaded from the MS OFFICE software (or, e.g., from the online MS OFFICE software) by a user in possession of a CP-ABE key, all the cells with a policy satisfiable by the key attributes will be decrypted and displayed. Henceforth, the same MS OFFICE document can be shared with a wide audience while enabling selective access control at a cell level in MS EXCEL, for example.

The foregoing description, for purpose of explanation, has been described with reference to specific embodiments. However, the illustrative discussions above are not intended to be exhaustive or to limit embodiments of the present invention to the precise forms disclosed. Many modifications and variations are possible in view of the above teachings. The embodiments were chosen and described in order to best explain the principles of the present disclosure and its practical applications, to thereby enable others skilled in the art to best utilize embodiments of the present invention with various modifications as may be suited to the particular use contemplated.

FIG. 5 depicts a computer system 500 that can be utilized in various embodiments of the present invention to implement the computer and/or the display, according to one or more embodiments.

Various embodiments of method and apparatus for selectively encrypting, decrypting, and sharing data in unstructured data containers using attribute based encryption, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 200, 300 and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowcharts of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure describes inventive concepts with reference to specific examples. However, the intent is to cover all modifications, equivalents, and alternatives of the inventive concepts that are consistent with this disclosure. Numerous specific details are set forth, such as number of keys, software specific documentation (i.e., MICROSOFT EXCEL, MICROSOFT WORD, etc.), number and type of parameters, cipher policy, number of people, etc., in order to provide a thorough understanding of the present design. It will be apparent, however, to one of ordinary skill in the art that the present design can be practiced without these specific details. Thus, the specific details set forth are merely exemplary. Also, the features implemented in one embodiment may be implemented in another embodiment where logically possible. The specific details can be varied from and still be contemplated to be within the spirit and scope of the present design. Furthermore, this disclosure is to be considered as exemplary and not restrictive in character, and all changes and modifications that come within the guidelines of the disclosure are desired to be protected.

The invention claimed is:
1. A method for selectively encrypting and decrypting portions of data based on one or more security attributes or security policies, the method comprising:
   accessing a collection of data in an unstructured data container having one or more data subgroups;

assigning one or more security attributes or security policies to one or more data subgroups in the unstructured data container to control access to the unstructured data container; and sending a call to an encryption service, wherein the call includes the unstructured data container and the one or more security attributes or security policies to selectively encrypt the one or more data subgroups within the unstructured data container based on the one or more security attributes or security policies assigned to each of the one or more data subgroups within the unstructured data container to obtain an encrypted ciphertext of the collection of data subgroups in the unstructured data container, wherein different subgroups of data within the one or more data subgroups within the unstructured data container are assigned different security attributes or security policies, and wherein each data subgroup within the one or more data subgroups that has a different security attribute or security policy assigned is encrypted based on the one or more security attributes or security policies assigned to that data subgroup.

2. The method of claim 1, wherein the unstructured data container is one or more of an unstructured document, unstructured database, text file, spreadsheets, email, HTML page, PDF file, image file, video stream or an audio stream.

3. A method for selectively encrypting and decrypting portions of data based on one or more security attributes or security policies, the method comprising:
   accessing a collection of data in an unstructured data container having one or more data subgroups;
   assigning one or more security attributes or security policies to one or more data subgroups in the unstructured data container to control access to the unstructured data container;
   sending a call to an encryption service, wherein the call includes the unstructured data container and the one or more security attributes or security policies to selectively encrypt the one or more data subgroups within the unstructured data container based on the one or more security attributes or security policies assigned to each of the one or more data subgroups within the unstructured data container to obtain an encrypted ciphertext of the collection of data subgroups in the unstructured data container;
   receiving the encrypted ciphertexts from the encryption service; and
   sending the encrypted ciphertext of the unstructured data container to a plurality of parties, wherein each party of the plurality of parties can only decrypt a portion of the data based on a secret key that was sent to the party.

4. The method of claim 3, wherein the encryption is performed using one of a Ciphertext-policy Attribute Based Encryption (CPABE) scheme, a key-policy Attribute Based Encryption scheme (KPABE), or a hybrid encryption scheme.

5. A method for selectively encrypting and decrypting portions of data based on one or more security attributes or security policies, the method comprising:
   accessing a collection of data in an unstructured data container having one or more data subgroups;
   assigning one or more security attributes or security policies to one or more data subgroups in the unstructured data container to control access to the unstructured data container;
   sending a call to an encryption service, wherein the call includes the unstructured data container and the one or more security attributes or security policies to selectively encrypt the one or more data subgroups within the unstructured data container based on the one or more security attributes or security policies assigned to each of the one or more data subgroups within the unstructured data container to obtain an encrypted ciphertext of the collection of data subgroups in the unstructured data container;
   receiving, at an encryption service, the unencrypted unstructured data container having one or more data subgroups, one or more security attributes or security policies for the unstructured data container, and one or more public keys;
   selectively encrypting one or more data subgroups within the unstructured data container using the one or more public keys and the one or more security attributes or security policies to generate an encrypted ciphertext;
   accessing the unstructured data container having selectively encrypted one or more data subgroups within the collection of data; and
   responsive to a request by a first user, sending a call to a decryption service to selectively decrypt the one or more data subgroups within the unstructured data container using a secret key associated with the first user and based on the one or more security attributes or security policies assigned each of the one or more data subgroups within the collection of data, wherein the call includes the collection of data and the one or more security attributes or security policies.

6. The method of claim 5, wherein different subgroups of data within the one or more data subgroups within the collection of data of the unstructured data container are assigned different security attributes or security policies.

7. The method of claim 6, wherein each data subgroup within the one or more data subgroups that has a different security attribute or security policy assigned is encrypted based on the one or more security attributes or security policies assigned to that data subgroup.

8. The method of claim 5, further comprising:
   at a decryption service, receive the unstructured data container having selectively encrypted one or more data subgroups within the collection of data, a secret key of the first user, and one or more public keys; and
   selectively decrypting one or more data subgroups within the unstructured data container using the one or more public keys and the secret key of the first user.

* * * * *